June 4, 1968  R. C. ROTHWEILER  3,387,252
WATERPROOF COVER ASSEMBLY FOR ELECTRIC SOCKETS
Filed July 13, 1966
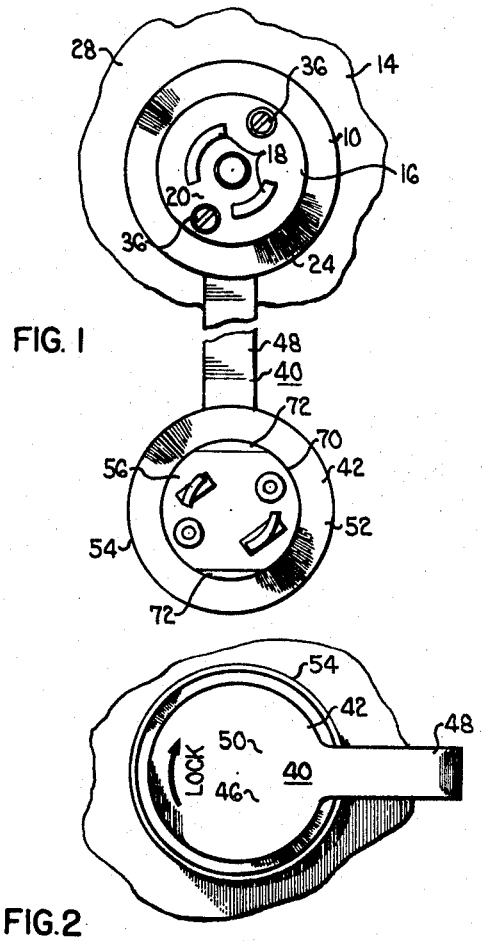
FIG. 1
FIG. 2
FIG. 3
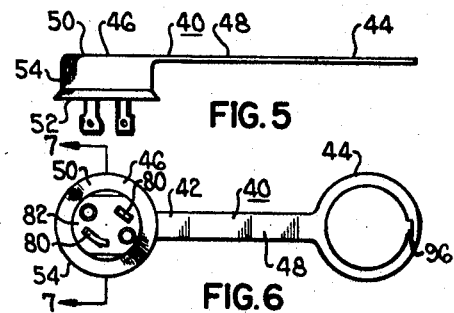
FIG. 5
FIG. 6
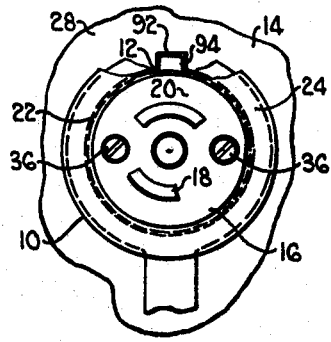
FIG. 4
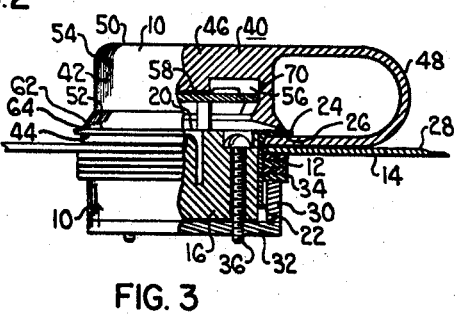
FIG. 7
INVENTOR.
RICHARD C. ROTHWEILER
BY
*William H. Schmeling*

United States Patent Office 3,387,252
Patented June 4, 1968

1

3,387,252
WATERPROOF COVER ASSEMBLY FOR
ELECTRIC SOCKETS
Richard C. Rothweiler, Wauwatosa, Wis., assignor to
Square D Company, Park Ridge, Ill., a corporation
of Michigan
Filed July 13, 1966, Ser. No. 564,851
6 Claims. (Cl. 339—38)

ABSTRACT OF THE DISCLOSURE

An electric socket cover including a single elastomeric member that has a portion which provides a seal between the socket and its mounting panel, a portion which provides waterproof cover for the socket and a portion which provides a hinge between the sealing portion and the cover portion to prevent loss of the cover portion when it is detached from the socket.

---

This invention relates to waterproof cover assemblies for electric sockets and is more particularly concerned with an inexpensive structure incorporting a unitary elastomeric member that will provide a seal between an electric socket and its mounting panel, a waterproof cover for the socket, and a hinge for securing the cover against inadvertent detachment from the socket and loss when the cover is detached from the socket.

Conventional waterproof covers for electric sockets usually comprise a plurality of individual members assembled to provide a cover for the socket, a seal between the socket and a panel wherein the socket is mounted, and a ball or bead type chain to prevent loss of the cover when the cover is separated from the socket.

In the structure according to the present invention, a unitary elastomeric member replaces the three individual members heretofore required and provides: a seal between the socket and its mounting panel, a waterproof cover for the socket, and a portion extending between the cover and socket to panel sealing portion that contributes to the maintenance of the sealing position of the cover on the socket as well as a structure having a pleasing appearance and less susceptible to destruction than structures employing bead or ball type chains and the like.

It is an object of the present invention to provide a simple, durable, waterproof cover for an electric socket that is economical to manufacture, convenient to use and reliable in its operation.

Another object is to provide a waterproof cover assembly for an electric socket capable of withstanding rough usage without damage wherein a unitary elastomeric member provides a seal between the socket and its mounting panel, a waterproof cover for the socket, and a connection between the seal and cover to prevent accidental displacement of the cover from the socket when the cover is applied to the socket and loss of the cover when the cover is detached from the socket.

An additional object is to provide a waterproof cover assembly for an electric socket having a body portion extending through an opening in a panel and an annular rim covering front surface portions of the panel surrounding the opening wherein the cover assembly includes a unitary member of elastomeric material having: an annularly shaped portion positioned between the rear face of the rim and the front face of the panel to provide a seal between the socket and the panel, a cap portion supporting male-like members receivable in complementary fe-

2 male openings in the socket for maintaining a deformable lip portion on the cover portion in a sealing position relative to the front face of the rim and a ribbon-like connecting or hinge portion which is indexed relative to the socket to be relaxed when the cover is in position on the socket and deformed during removal of the cover to thus supply a force for maintaining the cover against removal from its sealing position on the socket and to prevent loss of the cover when the cover is detached from the socket.

Further objects and features of the invention will be readily apparent to those skilled in the art from the specification and appended drawings illustrating certain preferred embodiments in which:

FIG. 1 is a front plan view illustrating an electric socket mounted in a portion of a panel and a rear view of a cover assembly according to the present invention.

FIG. 2 is a front view of the cover assembly in FIG. 1 assembled to the socket.

FIG. 3 is a side elevational view partly in section showing the cover assembly in FIG. 1 assembled to the socket.

FIG. 4 is a front plan view showing a preferred manner in which the socket indexes the cover assembly in FIG. 3.

FIGS. 5 and 6 respectively show in reduced size a side and a rear view of the cover assembly according to the present invention.

FIG. 7 is a cross sectional view taken along line 7—7 in FIG. 6.

In the drawings, an electric socket or plug receptacle 10 is illustrated as mounted in an opening 12 in a panel 14. The socket 10 is of a well known commercially available type and includes a body 16 of molded insulating material having a pair of female openings 18 extending from a front face 20 inwardly into the body 16. The openings 18 are preferably arcuate in shape and spaced equally from a center of the body 16 and have a radius of curvature defined by the distance from an axis passing perpendicular to the panel 14 and the center of the body 16. Positioned within each of the openings in the body 16 are female-type contact jaws, not shown, connectible to a source of electric current, as in conventional practices. Surrounding the body 16, and preferably immovably secured thereto, is a sleeve 22 having an annular rim or flange 24 extending outwardly of the front face 20. The diameter of the opening 12 permits the sleeve 22 and body 16 to extend through the opening 12 while a bottom surface 26 of the rim 24 overlays a front face portion 28 of the panel 14. The socket 10 is maintained in the opening 12 by a sleeve member 30, an insulating disc 32, one or more annular spacers 34, a pair of screws 36.

A waterproof cover assembly 40 for the socket 10 includes a unitary member 42, preferably formed of a suitable molded elastomeric material, e.g., natural or synthetic rubber materials or combinations thereof which are resilient and deformable, to have an annular mounting portion 44 at one end and a cover portion 46 at its opposite end. Interconnecting the mounting portion 44 and the cover portion 46 is a flexible hinge portion 48 having a ribbon-like shape. The cover portion 46 preferably is annular in shape and has a front wall 50 and a rear wall 52 with a generally cylindrical side wall 54 extending between the front wall 50 and the rear wall 52. Extending inwardly into the body of the cover portion 46 from the rear wall 52 is a cavity 56 having a bottom wall 58. Extending outwardly of the cylindrical side wall 54 is an inclined surface 62 extending to a circular edge 64. A frusto-conical surface 66 extends inwardly from the edge 64 as a wall of the cavity 56 and together with the inclined surface 62 provides an annularly shaped deformable lip 68 having tapered surfaces extending to the edge 64. The cavity 56 additionally has a cylindrical wall 70 extending inwardly from the surface 66 to a pair of spaced ledges 72 extending inwardly from opposite side walls of the cavity to provide a passage therebetween. The ledges 72 each have a surface 74 facing and spaced above the bottom wall 58. The cover assembly 40 also includes a pair of male members 80 and an insulating member 82. The insulating member 82 is formed of rigid strip-like material and shaped to be held in the cavity 56 by the bottom wall 58 and the surfaces 74. Each of the male members 80 have portions 84 extending through suitably located openings in the member 82 secured to the insulating member 82. The male members 80 have an arcuate cross section and are located by the member 82 to be received in the openings 18. Each of the male members 80 has an opening 87 and a laterally extending portion 88 which provides a shoulder 90 intermediate a free end of the members 80 and the lip 68. The members 80 are positioned by the member 82 to have the portions 88 extend in opposite directions.

As shown in FIG. 4, a portion of the panel 14 surrounding the opening 12 is provided with an indexing notch 92 and the sleeve 22 has a projection 94 received in the notch 92 when the socket 10 is assembled to the panel 14. A notch 96 in the annular mounting portion 44, as in FIG. 6, also receives the projection 94 when the cover assembly 40 and the socket 10 are assembled to the panel 14 as follows.

Initially the annular mounting portion 44 is positioned to circumscribe the sleeve 22 and engage the bottom face 26 with the projection 94 received in the notch 96. Thus the hinge portion 48 and the openings 18 will be in a predetermined angular relation to each other. The socket 10 is positioned in the opening 12 to have the projection 94 extend into the notch 92 with the annular mounting 44 in engagement with the front face 28 to index the socket 10 in a predetermined position relative to the panel. The installation of the socket 10 in the opening 12 is completed by positioning the desired number of annular spacers 34, the insulating disc 32 and the sleeve member 30 on the sleeve 22 and tightening the pair of screws 36, extending through suitably located bores in the body 16, into threaded openings in the insulating disc 32. The tightening of the screws 36 will cause the annular mounting portion 44 to be tightly compressed between the bottom face 26 of the rim 24 and the front face 28 of the panel 14 to provide a water tight seal between the rim 24 and the panel 14.

In the device illustrated, the insulating disc 32 and the sleeve member 34 are shown as individual members. Manifestly, the disc 32 and member 34 may be formed as a single cup-shaped member. Further, a plurality of spacers 34 are shown. The number of spacers required will depend on the thickness of the panel 14 and are varied to assure a tight seal between the rim 24, the mounting portion 44 and the panel 14 upon tightening of the screws 36.

When the cover portion 46 is detached from the socket 10, the hinge or connecting portion 48 will be substantially flat and straight while positioning the cover portion 46 remote from the socket 10 and adjacent the panel 14. The hinge portion 48 will prevent detachment of the cover portion 46 from the panel 14 and thus prevent loss of the cover portion 46 while detached.

The cover 46 is applied to the socket 10 by positioning the male members 80 in the openings 12. When the cover 46 is thus positioned, the hinge portion 48 will be folded upon itself and be slightly twisted from its normal flat shape, urging the cover portion in a clockwise direction of rotation, as in FIG. 1. The cover 46 is secured in the socket 10 by rotating the cover 46 clockwise, as in FIG. 2, to a sealing position wherein the hinge portion 48 will appear as a flat untwisted loop and present a pleasing appearance as well as oppose rotation of the cover in either direction. The socket 10, including the openings 18, is provided with a suitable means, not shown, which cooperates with the lateral extending portions 88 to require the edge 64 to be forced against the rim 24 before the cover 46 is rotatable clockwise. The force required to permit a clockwise rotation of the cover 46 will cause the material of the lip 68 to be deformed and move outwardly as portions of the lip 68 inwardly of the edge 64 engage the front face 20 of the rim 24 to provide a waterproof seal between the cover portion 46 and the rim 24.

The means in the socket 10 requiring the lip 68 to be deformed before the cover portion 46 may be rotated are arranged to be engaged by the ledge 90 and cooperate with openings 87 to resiliently maintain the cover 46 from rotating counterclockwise when the cover is in a sealing position.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A protective waterproof cover, for an electric socket having a body portion extending through an opening in a panel and an annular rim covering front surface portions of the panel surrounding the opening, comprising: a unitary body of molded elastomeric material having: an annular mounting portion on one end positioned between a rear surface of the annular rim and the front surface portion of the panel in a sealing egagement with the rim and the panel, a cover portion on an end opposite the said one end, said cover portion having a front wall, a rear wall and a cavity extending from the rear wall toward the front wall to provide a bottom wall, an annular deformable lip extending outwardly of the rear wall sealingly engaging a front surface portion of the rim when the cover portion is rotated to a covering position relative to the socket, and a hinge integral with the cover portion and the mounting portion preventing disassembly of the cover portion from the socket when the cover portion is moved from the covering position, and at least one male member positioned by the bottom wall having a locking engagement with a female opening in the socket for maintaining the cover in the covering position and means including an indexing portion on the annular mounting portion for positioning the hinge portion when the cover is in the covering position.

2. The combination as recited in claim 1 wherein the male member and female opening are arcuate in shape and a portion on the male member engages a portion of the female opening to provide the locking engagement when the cover is rotated relative to the socket.

3. The combination as recited in claim 1 wherein the hinge portion is ribbon-like and the indexing portion positions the hinge so the elastomeric material of the hinge portion is relaxed when the cap is in the covering position.

4. The combination as recited in claim 1 wherein the means for positioning the hinge portion includes a projection on the annular rim of the socket, a notch in the perimeter of the opening in the panel and a notch in the inner periphery of the annular portion wherein the projection is received in the notches of the panel and annular portion to position the annular portion on socket on the panel.

5. The combination as recited in claim 1 wherein the socket has a pair of female terminal members and a pair of male terminal-like members are positioned on the bottom wall by an insulating member.

6. The combination as recited in claim 5 wherein a pair of inwardly extending ledges on an inner wall of the cavity and spaced from the bottom wall positions the insulating member.

References Cited

UNITED STATES PATENTS

| | | |
|---|---|---|
| 1,265,163 | 5/1918 | Bahls et al. |
| 1,362,992 | 12/1920 | Haywood et al. |
| 1,824,657 | 9/1931 | Coldwell _____ 339—63 |
| 2,423,277 | 7/1947 | Weissman _____ 339—94 |
| 2,452,922 | 11/1948 | Gonsett et al. |
| 2,751,566 | 6/1956 | Buquor. |
| 3,267,408 | 8/1966 | Baker et al. _____ 339—38 |
| 3,339,171 | 8/1967 | Carlson _____ 339—42 |

FOREIGN PATENTS

| | | |
|---|---|---|
| 1,062,304 | 7/1959 | Germany. |

MARVIN A. CHAMPION, *Primary Examiner.*

JOSEPH H. McGLYNN, *Assistant Examiner.*